United States Patent [19]
Baba et al.

[11] 3,851,305
[45] Nov. 26, 1974

[54] COLLISION DETECTING SYSTEM FOR A MOTOR VEHICLE

[75] Inventors: Kosaku Baba; Akio Hosaka; Hiromichi Nakamura, all of Yokohama, Japan

[73] Assignee: Nissan Motor Company Limited, Yokohama City, Japan

[22] Filed: May 22, 1972

[21] Appl. No.: 255,823

[30] Foreign Application Priority Data
May 28, 1971 Japan.............................. 46-36269
Aug. 14, 1971 Japan.............................. 46-61431

[52] U.S. Cl................. 340/52 H, 180/103, 340/53, 340/258 R, 340/262, 343/112 CA
[51] Int. Cl. ........................................... B60r 21/08
[58] Field of Search........... 340/52 R, 52 H, 258 R, 340/258 B, 262, 53; 307/10 R, 231; 200/61.45; 180/103, 82 R; 280/150 B, 150 AB; 325/29; 343/112 CA

[56] References Cited
UNITED STATES PATENTS
3,689,882  9/1972  Dessailly............................ 340/258
3,714,627  1/1973  Dillman et al.................... 340/52 H Primary Examiner—John W. Caldwell
Assistant Examiner—Joseph E. Nowicki

[57] ABSTRACT

An electric collision detecting system usable for a motor vehicle safety device such as inflatable protector bag and stretchable netting. The system has a collision detector for producing a collision signal when an object contacts the motor vehicle, and a deceleration detector for producing a real deceleration signal having a magnitude in proportional to the magnitude of a deceleration subjected to the motor vehicle. The collision detector is connected to a function generator which produces a reference deceleration signal upon receipt of the collision signal and this signal is passed to a comparator. The deceleration detector is connected to the comparator and this comparator functions to produce a drive signal when the real deceleration signal exceeds the reference deceleration signal. There is an actuator connected to the comparator through a gate circuit for actuating the safety device upon receipt of the drive signal.

9 Claims, 17 Drawing Figures

COLLISION DETECTING SYSTEM FOR A MOTOR VEHICLE

The present invention relates to a collision detector which is advantageous for use with motor vehicle safety devices.

The inflatable protector bag or stretchable protector netting is mounted on a motor vehicle for the purpose of protecting the occupant of the motor vehicle from incurring a serious injury in the event of a collision or rapid deceleration of the motor vehicle which is cruising. The protector bag or netting thus serves as a restraint of the occupant of the motor vehicle so that the forward or otherwise detected momentum of the motor vehicle occupant is substantially absorbed or dampened during the collision condition.

In order to provide full assurance of safety of the vehicle occupant during the collision, it is of importance that the protector bag or netting be capable of assuming the protectable position within a time interval in which the vehicle occupant is moved by the force of inertia a certain appreciable distance after the collision condition is initially encountered by the motor vehicle.

A problem has been encountered in that the protector bag or netting having the collision detecting means which is capable of responding to the deceleration of a relatively low degree is liable to be actuated to the protective position even in response to those shocks or relatively soft contact or collisions of the motor vehicle which will not seriously hurt the vehicle occupant as experienced during parking or garaging.

In order to the above-mentioned problem, various collision detecting syatems have been devised, which are, however, not fully acceptable.

It is therefore an important object of the present invention to provide an electric collision detecting system which is capable of rapidly and certainly detecting the collision of a motor vehicle.

It is another object to provide an electric collision detecting system which stays inoperative in the event a motor vehicle on which the system is mounted is subjected to simple shocks or brought into relatively light contact with other objects.

It is a further object to provide an electric collision detecting system which has a simple construction.

It is a still further object to provide an electric collision detecting system which can be readily tested for its own operational condition through a simple procedure.

It is a still further object to provide an electric collision detecting system which can operates in different ways in dependence on either the frontal or side collision of the motor vehicle.

Other and more particular objects and advantages will be apparent from the following detailed description taken in conjunction with the appended drawings in which:

Figure 1:
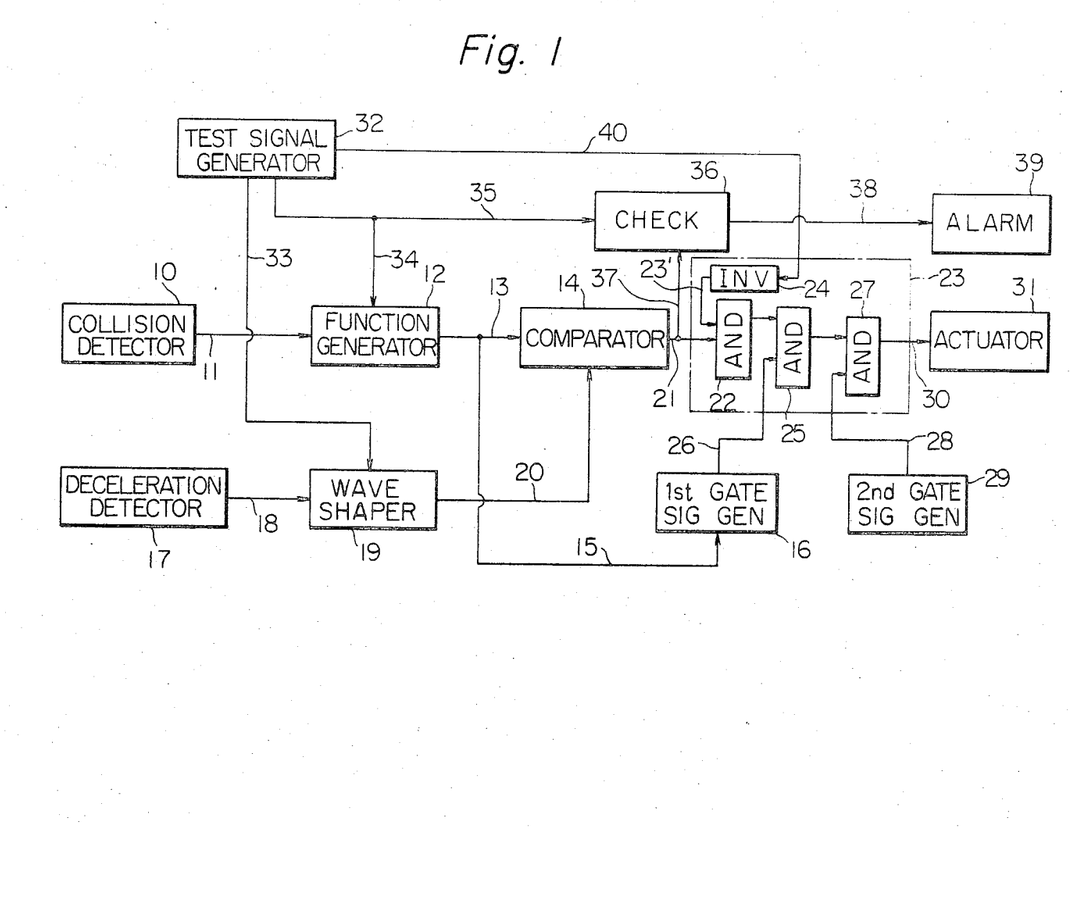
FIG. 1 is a schematic block diagram of a collision detecting system according to the invention.

Referring now to the drawings and more specifically to FIG. 1 thereof, there is shown an electric collision detecting system according to the present invention, which is to be mounted on a motor vehicle together with a safety device and comprises a collision detector 10. The collision 10 is arranged to produce on its output terminal a trigger signal when an object either closely approaches to or contacts with the motor vehicle on which the system is mounted. The ouput terminal of the collision detector 10 is connected through a line 11 to an input terminal of a function generator 12 which is arranged to produce on its output terminal a reference deceleration signal when the trigger signal from the collision detector 10 is applied to the input terminal thereof. The output terminal of the function generator 12 is connected through a line 13 to one input terminal of a comparator 14, which is adapted to produce on an output terminal logical 1 signal when a signal applied to the other input terminal thereof exceeds the reference signal applied to the one input terminal thereof. The output terminal of the function generator 12 is further connected through a line 15 to an input terminal of a first gate signal generator 16, which is adapted to produce on its output terminal a gate signal when the reference deceleration signal on the line 15 lowers below a predetermined value. A deceleration detector 17 is adapted to produce on its output terminal a real deceleration signal having a magnitude proportional to a magnitude of a deceleration to which the motor vehicle is subjected. A deceleration detector of the type which provides a real deceleration signal having a magnitude proportional to a magnitude of a deceleration to which a motor vehicle is subjected can be obviously constructed if reference is made to French Patent No. 884,704 which teaches the use of free rotating wheel 4 equipped with a tachometric generator 5. Across the tachometric generator a DC voltage having a magnitude proportional to the magnitude of a real vehicle speed is obtained. Thus, by differentiating this DC voltage with respect to time with a differential circuit, a real deceleration signal (which is a DC voltage) having a magnitude proportional to a real deceleration to which the motor vehicle is subjected will be obtained. An output terminal of the deceleration detector 17 is connected through a line 18 to an input terminal of a wave-shaper 19, which is adapted to shape the waveforms of the real deceleration signal from the deceleration detector 17. An output terminal of the wave-shaper 19 is connected through a line 20 to the other input terminal of the comparator 14. An output terminal of the comparator 14 is connected through a line 21 to one input terminal of a first AND gate 22 of a gate circuit 23. The other terminal of the AND gate 22 is connected through a line 23 to an output terminal of an inverter 24. An input terminal of the AND gate 22 is connected through a line 23' to an output terminal of an inverter 24 of the gate circuit 23. An output terminal of the AND gate 22 is connected to one input terminal of a second AND gate 25 of the gate circuit 23. The other input terminal of the second AND gate 25 is connected through a line 26 to an output terminal of the first gate signal generator 16. An output terminal of the second AND gate 25 is connected to one input terminal of a third AND gate 27. The other input terminal of the AND gate 27 is connected through a line 28 to an output terminal of a second gate signal generator 29 which is arranged to produce a second gate signal at the expiration of a predetermined time period from the time when an electric power is exerted on the whole system. An output terminal of the AND gate 27 is connected through a line 30 to an input terminal of an actuator 31. An output terminal of the actuator 31 is to be connected to a safety device such as inflatable protector bag or stretchable protector netting.

The particular collision-detecting system above-mentioned is combined with a testing circuit for testing the collision detecting system for its function. The testing circuit includes a test signal generator 32 which may be manually started and then produces a pseudo deceleration signal on its first output terminal which is connected through a line 33 to an input terminal of the wave-shaper 19. The test signal generator 32 further produces a test trigger signal on its second output terminal which is connected through a line 34 to an input terminal of the function generator 12 and through a line 35 to one input terminal of a checking circuit 36 the other input terminal of which is connected through a line 37 to the output terminal of the comparator 14. The checking circuit 36 is adapted to produce on its output terminal an alarm signal or a logical 1 signal when the checking circuit does not receive a logical 1 signal through the other input terminals. The output terminal of the checking circuit 36 is connected through a line 38 to an input terminal of an alarm circuit 39 which alarms when received a logical 1 signal through the input terminal. The test signal generator 32 further has a third output terminal on which the test signal generator 32 produces a disabling signal until the test signal generator 32 is reset. The third output terminal of the test signal generator 32 is connected through a line 40 to an input terminal of the inverter 24.

Figure 2:
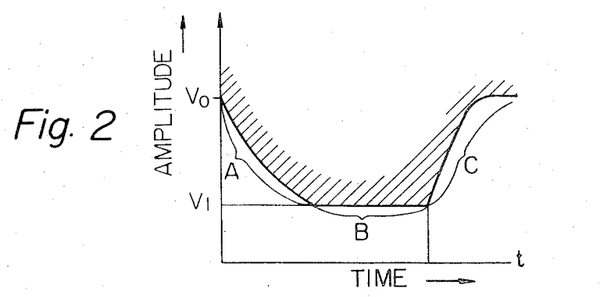
FIGS. 2 and 3 are graphic illustrations showing signals appearing in the system of FIG. 1.
Figure 3:
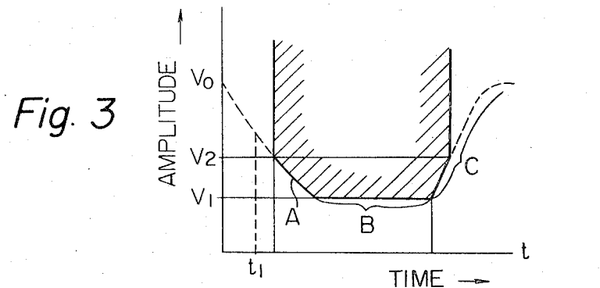

When, in operation, the collision detector 10 detects the closely approach or contact of an object to the motor vehicle and produces the trigger signal, the function generator 12 is triggered by the trigger signal and produces on its output terminal the reference deceleration signal as shown by a curve A in FIG. 2, in which the abscissa and ordinate axes represent the time and the amplitude, respectively. The deceleration detector 17, on the other hand, produces the real deceleration signal, which is then wave-shaped in the wave-shaper 19 which removes ripple components from the deceleration signal. The comparator 14 receives the reference deceleration signal and the wave-shaped real deceleration signal and produces a logical 1 signal when the real deceleration signal exceeds the reference deceleration signal, viz., the comparator 14 produces a logical 1 signal when the amplitude of the real deceleration signal locates in a region shown by hatching in FIGS. 2. The logical 1 signal from the comparator 14 is applied through the line 21 to one input terminal of the AND gate 22. When, in this instance, the test signal generator 32 stays inoperative, logical 0 signal resides on the line 40 and therefore a logical 1 signal appears on the line 23', so that the logical 1 signal from the comparator 14 passes through the first AND gate 22. When, in this instance, the reference deceleration signal reduces to a predetermined value $v_2$, the comparator 16 produces the first gate signal which is applied to the second AND gate 25 and causes the logical 1 signal from the first AND gate 22 to pass through the second AND gate 25. If the second gate signal generator 29 produces the second gate signal at a time $t_1$, the second AND gate 27 passes therethrough the logical 1 signal, which then appears on the line 30. As a consequence, the logical 1 signal, or drive signal appears on the line 30 when the real deceleration resides in a region shown by hatching in FIG. 3.

When the test signal generator 32 is started, the test signal generator 32 produces the pseudo deceleration signal, the test trigger signal and the disabling signal on the lines 33, 34 and 35, and 40. The particular signals are then applied to the wave-shaper 19, the function generator 12, the checking circuit 36 and the inventor 24, respectively. If the wave-shaper 19, the function generator 12 and the comparator 14 are in normal condition, a logical 1 signal appears on the line 37 and the checking circuit 36 does not produces any signal. If, on the contrary, one or more those circuits are inoperative, no signal appears on the line 37 and the checking circuit 36 produces a logical 1 signal on the line 38. The logical 1 signal on the line 38 energizes the alarm circuit 39, which then alarms the inoperative condition of the system.

Figure 4:
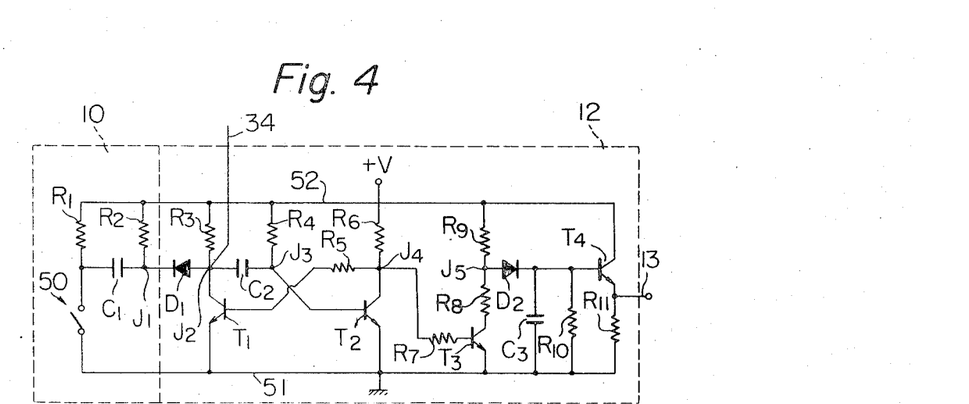
FIGS. 4 to 6 are diagrams showing various circuit arrangements usable for the system of FIG. 1.

In FIG. 4, a preferred circuit arrangement of the collision detector and the function generator 12 is shown, which comprises a normally-open switch 50 adapted to close when an object either closely approaches to or contact with the motor vehicle. The switch 50 is, for example, associated with a relay coil (not shown) which is energized through an electric circuit including a mechanical pressure detecting device or incorporated with a radar able to detect the close approach of an object to the motor vehicle. A movable contact of the switch 50 is, for example, to an earth bus line 51 which is grounded. A stationary contact of the switch 50 is connected through a resistor $R_1$ to a positive source bus line 52 which is connected to a positive electric source $+V$. The stationary contact of the switch 50 is connected through a capacitor $C_1$ and a resistor $R_2$ to the positive source bus line 52. A junction $J_1$ between the capacitor $C_1$ and the resistor $R_2$ is connected to a cathode of the diode $D_1$ an anode of which is connected to a collector of a transistor $T_1$. An emitter of the transistor is connected to the bus line 51. A junction $J_2$ between the collector and the anode is connected through a coupling capacitor $C_2$ and a resistor $R_4$ to the bus line 52. The junction $J_2$ may be connected to the line 34 led from the test signal generator 32. A base of the transistor $T_1$ is connected through a resistor $R_5$ to a junction $J_4$ between a resistor $R_6$ and a collector of a transistor $T_2$. The other terminal of the resistor $R_6$ is connected to the bus line 52. A base of the transistor $T_2$ is connected to a junction $J_3$ between the capacitor $C_2$ and the resistor $R_4$. An emitter of the transistor $T_2$ is connected to the bus line 51. The junction $J_4$ is connected through a resistor $R_7$ to a base of a transistor $T_3$ which has an emitter connected to the bus line 51. A collector of the transistor $T_3$ is connected through resistors $R_8$ and $R_9$ to the bus line 52. A junction $J_5$ between the resistors $R_8$ and $R_9$ is connected to an anode of a diode $D_2$ a cathode of which is connected a storing capacitor $C_3$ to the bus line 51. The cathode of the diode $D_2$ is further connected to a collector of a transistor $T_4$ and one terminal of a resistor $R_{10}$ which is in turn connected to the bus line 51. An emitter of the transistor $T_4$ is connected through a resistor $R_{11}$ to the bus line 51. A collector of the transistor $T_4$ is connected to the bus line 52. The emitter of the transistor $T_4$ is further connected to a terminal to be commected to the line 13 in FIG. 1.

When, in operation, the switch 50 is closed, the capacitor $C_1$ is charged by a current flowing through the resistor $R_2$ and the switch 50 so that a negative pulse appears. The negative pulse passes through the diode $D_1$ and triggers the monostable multivibrator including the transistors $T_1$ and $T_2$, thereby to cause the transistor $T_1$ to be non-conductive until the capacitor $C_2$ is fully charged. A positive pulse appears at the junction $J_4$ which causes the transistor $T_3$ to be conductive. Charge stored in the capacitor $C_3$ then discharged through the resistor $R_{10}$ and the base and the emitter of the transistor $T_4$, so that, such a voltage as shown by the curve A in FIG. 2 appears on the line 13. Since, after a while, discharging and charging currents of the capacitor $C_3$ equilibrate with each other, the voltage on the line 13 is expressed by the curve B in FIG. 2. When the monostable multivibrator returns to the initial state, the positive voltage at the junction $J_4$ decays whereby the capacitor $C_3$ is charged up so that the voltage on the line increases as expressed by the curve C.

Figure 5:
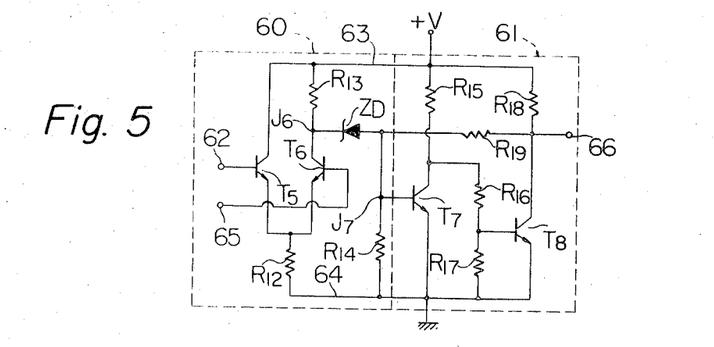

In FIG. 5, a preferred circuit arrangement of the comparator 14 is shown, comprising a differential amplifier 60 and a Schmidt trigger circuit 61 having its input trigger terminal connected to an output terminal of the differential amplifier 60. The differential amplifier 60 includes transistors $T_5$ and $T_6$. A base of the transistor $T_5$ is connected to an input terminal 62 to which the wave-shaper 19 is to be connected. A collector of the transistor $T_5$ is connected to a positive source bus line 63 which is connected to a positive source +V. An emitter of the transistor $T_5$ is connected through a resistor $R_{12}$ to an earth bus line 64 which is grounded. A base of the transistor $T_6$ is connected to an input terminal 65 to which the function generator 12 is to be connected. A collector of the transistor $T_6$ is connected through a resistor $R_{13}$ to the bus line 63. An emitter of the transistor $T_6$ is connected to the emitter of the transistor $T_5$. A junction $J_6$ between the collector of the transistor $T_6$ and the resistor $R_{13}$ is connected to a cathode of a zener diode ZD an anode of which is connected through a resistor $R_{14}$ to the bus line 64. The Schmidt trigger circuit includes transistors $T_7$ and $T_8$. A base of the transistor $T_7$ is connected to a junction $J_7$ between the anode of the zener diode ZD and the resistor $R_{14}$. An emitter of the transistor $T_7$ is connected to the bus line 64. A collector of the transistor $T_7$ is connected through a resistor $R_{15}$ to the bus line 63 and through resistors $R_{16}$ and $R_{17}$ to the bus line 64. The transistor $T_8$ has a base connected between the resistors $R_{16}$ and $R_{17}$ and an emitter connected to the bus line 64. A collector of the transistor $T_8$ is connected through a resistor $R_{18}$ to the bus line 63 and through a resistor $R_{19}$ to the anode of the zener diode ZD. An output terminal 66 is connected to the collector of the transistor $T_8$. In operation, the reference deceleration signal is applied to the terminal 65 and the real deceleration signal is applied to the terminal 62. When the amplitude of the real deceleration signal is lower than that of the reference deceleration signal, the transistor $T_6$ is nonconductive so that the potential at the junction $J_6$ is relatively low thereby to causing the transistor $T_7$ to be non-conductive and the transistor $T_8$ to be conductive. Therefore, the potential at the collector of the transistor $T_8$ is relatively low, viz., a logical 0 signal appears at the terminal 66. When, on the contrary, the amplitude of the real deceleration exceeds that of the reference deceleration signal, the transistor $T_5$ becomes conductive and the transistor $T_6$ becomes non-conductive so that the transistor $T_7$ becomes conductive and the transistor $T_8$ becomes non-conductive whereby a logical 1 signal appears at the output terminal 66. The above-described circuit arrangement is usable for the first gate signal generator 16.

Figure 6:
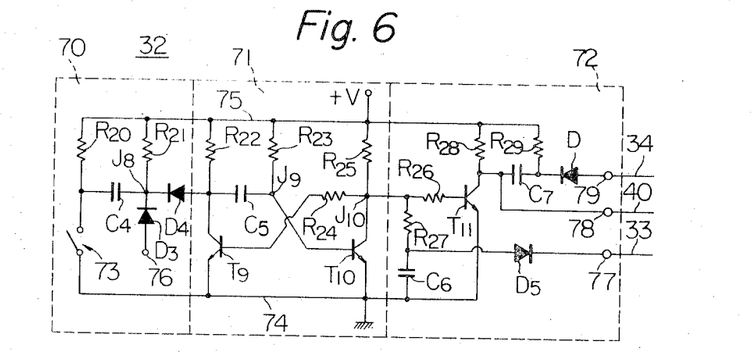

In FIG. 6, a preferred circuit arrangement for the test signal generator 32, which generally comprises a trigger circuit 70, a monostable multivibrator 71 and a signal generating circuit 72. The trigger circuit 70 includes a normally-open switch 73 which is adapted to close when the test signal generator 32 is intended to start. The movable contact of the switch 73 is connected to an earth bus line 74 which is grounded. The stationary contact of the switch 73 is connected through a resistor 20 to a positive source bus line 75 which is connected to a positive power source +V. The stationary contact of the switch 73 is connected through a capacitor $C_4$ and a resistor $R_{21}$ to the positive bus line 75. A junction between the capacitor $C_4$ and the resistor $R_{21}$ is connected to a cathode of a diode $D_3$ an anode of which is connected to an output terminal 76. The junction $J_8$ is further connected to a cathode of a diode $D_4$. The monostable multivibrator 75 includes a transistor $T_9$ which has a collector connected to an anode of the diode $D_4$ and through a resistor $R_{22}$ to the bus line 75. The collector of the transistor $T_9$ is connected through a coupling capacitor $C_5$ and a resistor $R_{23}$ to the bus line 75. An emitter of the transistor $T_9$ is connected to the bus line 74. A junction $J_9$ between the capacitor $C_5$ and the resistor $R_{23}$ is connected to a base of the transistor $T_{10}$ which has an emitter connected to the bus line 74. A collector of the transistor $T_{10}$ is connected through a resistor $R_{24}$ to a base of the transistor $T_9$ and through a resistor $R_{25}$ to the bus line 75. The signal generating circuit 72 includes a transistor $T_{11}$ which has a base connected through a resistor $R_{26}$ to a junction between the resistors $R_{24}$ and $R_{25}$ and an emitter connected to the bus line 74. The junction $J_{10}$ is connected through a resistor $R_{27}$ and a storing capacitor $C_6$ to the bus line 74. A collector of the transistor $T_{11}$ is connected through a resistor $R_{28}$ to the bus line 75 and through a capacitor $C_7$ and a resistor $R_{29}$ to the bus line 75. A junction between the resistor $R_{27}$ and the storing capacitor $C_6$ is connected to an anode of a diode $D_5$ a cathode of which is connected to an output terminal 77. An output terminal 78 is connected to the collector of the transistor $T_{11}$. An output terminal 79 is connected to an anode of a diode $D_6$ a cathode of which is connected to a junction between the resistor $R_{29}$ and the capacitor $C_7$. The output terminals 34, 40 and 33 are to be connected to the lines 34, 40 and 33, respectively. The line 34 may be connected to the output terminal 76, if desired.

When, in operation, the switch 73 is closed, a charge current flows through the resistor $R_{21}$ and the capacitor $C_4$ so as to charge the capacitor $C_4$, whereby a negative pulse appears at the junction $J_8$ which is then delivered through the diode $D_4$ to the monostable multivibrator 71. The monostable multivibrator is triggered, thereby to produce a positive pulse at the junction $J_{10}$. The positive pulse causes the capacitor $C_6$ to be charged and makes the transistor $T_{11}$ conductive. A positive pulse therefore appears at the terminal 78 and a negative spike pulse appears at the terminal 79.

Figure 7:
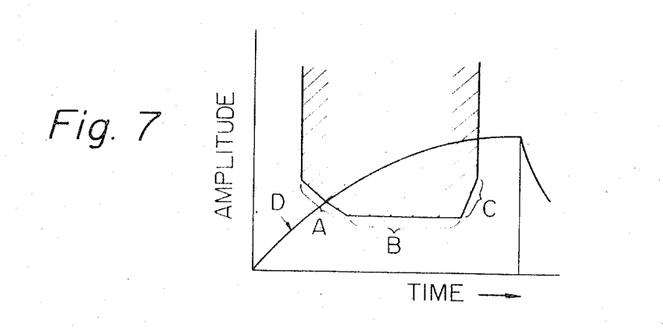
FIG. 7 is a graphic illustration showing a test signal appearing in the system of FIG. 1.

In FIG. 7, variation of voltage on the terminal 77 of the circuit of FIG. 6 is shown by a curve D.

Figure 8:
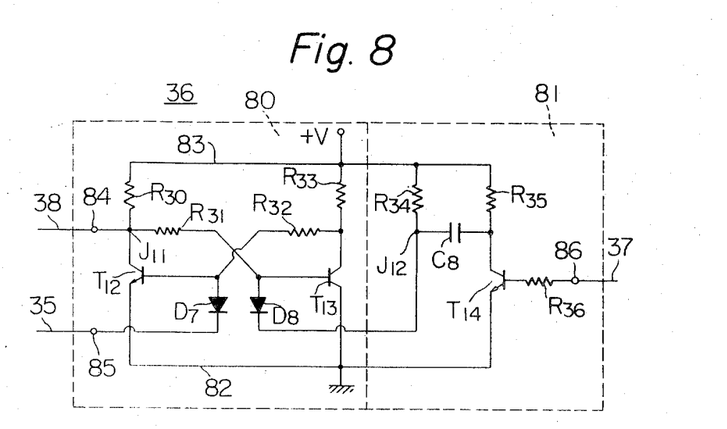
FIG. 8 is a diagram showing a circuit arrangement usable for the system of FIG. 1.

In FIG. 8, a preferred circuit arrangement for the checking circuit 36 of FIG. 1 is illustrated which includes a flip-flop circuit 80 and a trigger circuit 81. The flip-flop circuit 80 includes a transistor $T_{12}$ which has an emitter connected to an earth bus line 82 and a collector connected through a resistor $R_{30}$ to a positive source bus line 83. A junction $J_{11}$ between the resistor $R_{30}$ and the collector of the transistor $T_{12}$ is connected through a resistor $R_{31}$ to a base of a transistor $T_{13}$ and to an output terminal 84 to which the alarm circuit 39 is to be connected through the line 38. A base of the transistor $T_{12}$ is connected through a resistor $R_{32}$ to a collector $T_{13}$ and to an anode of a diode $D_7$ having a cathode connected to an input terminal 85 to which the test signal generator 32 is to be connected through the line 35. An emitter of the transistor $T_{13}$ is connected to the bus line 82. The collector of the transistor $T_{13}$ is further connected through a resistor $R_{33}$ to the bus line 83. The trigger circuit 81 includes a transistor $T_{14}$ which has an emitter connected to the bus line 82 and a collector connected through a resistor $R_{35}$ to the bus line 83 and through a capacitor $C_8$ and a resistor $R_{34}$ to the bus line 83. A junction $J_{12}$ between the capacitor $C_8$ and the resistor $R_{34}$ is connected to a cathode of a diode $D_8$ having an anode connected to the base of the transistor $T_{13}$. A base of the transistor $T_{14}$ is connected through a resistor $R_{36}$ to an input terminal 86 to which the comparator 14 is to be connected through the line 37.

When, in operation, the trigger signal from the test signal generator 32 is applied through the line 35, the flip-flop circuit 80 turns its state. The test signal generator 32, on the other hand, starts the function generator 12 and the wave-shaper and, therefore, a logical 1 signal appears on the output terminal of the comparator 14, when all of these particular elements are normally operative. The logical 1 signal, namely positive pulse is applied through the line 37 to the input terminal 86 and causes the transistor $T_{14}$ to be conductive. At this instant, the capacitor $C_8$ is charged and a negative pulse develops at the junction $J_{12}$, which pulse is delivered through the diode $D_8$ so as to reset the flip-flop circuit 80. Hence, no positive or 1 signal appears at the output terminal 84 as long as the function generator 12, the wave-shaper 19, the comparator 14 etc. are normally operative.

If, on the contrary, one or more of the particular elements is inoperative, the flip-flop circuit is not reset by the trigger circuit 81 so that a logical 1 signal appears on the output terminal 84, which energizes the alarm circuit 39.

In this instance, it is to be noted that the deceleration of a motor vehicle in the case of collision varies in different ways in accordance with where the collision takes place in the motor vehicle. It is therefore desirable that the collision detecting system operates in different ways in accordance with the manner of the collision.

Figure 9:
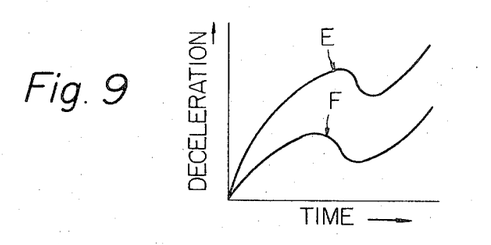
FIG. 9 is a graph showing variations of the deceleration of the motor vehicle in the event of a collision of the motor vehicle.

FIG. 9 graphically shows the variation of the deceleration taken place in the motor vehicle in which the abscissa and ordinate axes respectively represent the time and the magnitude of deceleration. A curve E represents a variation of deceleration in the case of sideward collision taken place in a side portion of a motor vehicle. A curve F represent another variation of deceleration in the case of a frontal collision taken place in a frontal portion of a motor vehicle.

Figure 10:
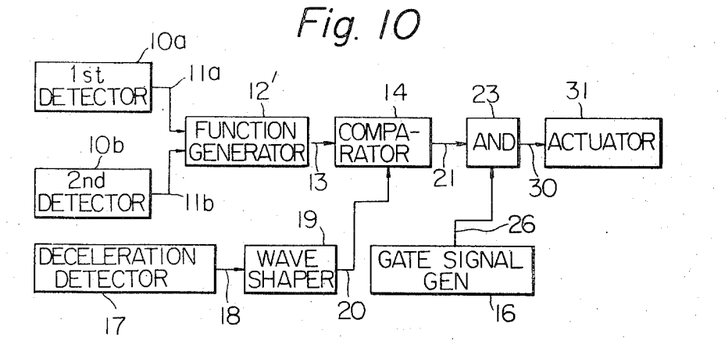
FIG. 10 is a schematic block diagram of another collision detecting system according to the invention.
Figure 11:
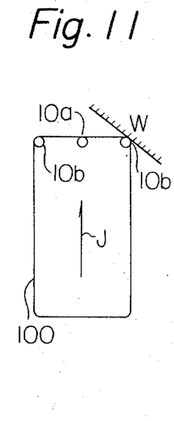
FIG. 11 is a diagram simply showing a motor vehicle.

In FIG. 10, a preferred collision detecting system which can operate in different ways in accordance with the manner of collision of a motor vehicle is shown having a similar construction to that of FIG. 1, except that this system includes a pair of first and second collision detectors 10a and 10b and a function generator 12 adapted to two kinds of reference signals in response to signals from the first and second collision detectors 10a and 10b. The first and second collision detectors 10a and 10b may be mounted on frontal and side portions of a motor vehicle as shown in FIG. 11, wherein the motor vehicle is shown by a rectangle 100. The motor vehicle runs in a direction as indicated by an arrow J. The first and second collision detectors 10a and 10b have the same function as the collision detector 10 in the system of FIG. 1.

Figure 12:
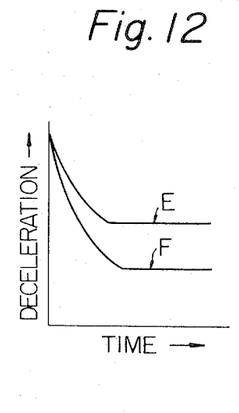
FIGS. 12 and 13 are graph showing signals appearing in the system of FIG. 10.
Figure 13:
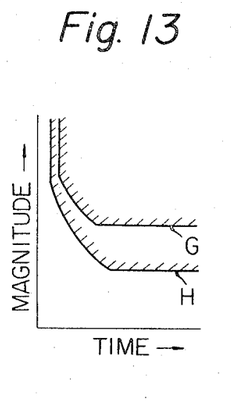

When, in this instance, an object closely approaches or contacts a frontal portion of the motor vehicle, the first detector 10a produces on a line 11a a trigger signal which is applied to the function generator 12', which then produces on a line 13 a first reference signal as shown by a curve G in FIG. 12 wherein the abscissa and ordinate axes respectively represent the time and the magnitude of the reference signal. When, on the contrary the motor vehicle closely approaches to or contacts with a wall W or the like as shown in FIG. 11, the second detector 10b produces on a line 11b a second reference deceleration signal as shown by a curve H in FIG. 12. An actuator 31 in the system of FIG. 10 therefore produces a drive signal when the magnitude of the real deceleration resides in a region above the curve G or H, as shown in FIG. 13.

Figure 14:
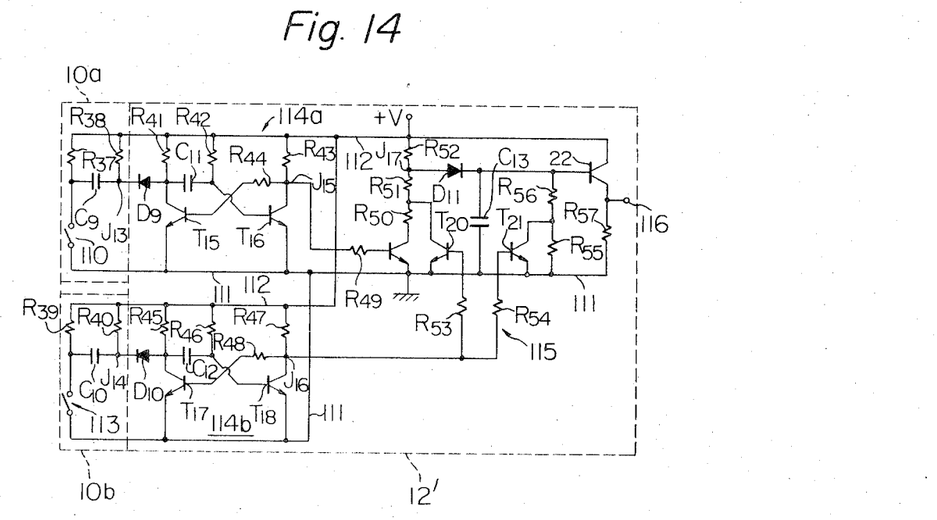
FIG. 14 is a diagram showing circuit arrangements usable for the system of FIG. 12.
Figure 15:
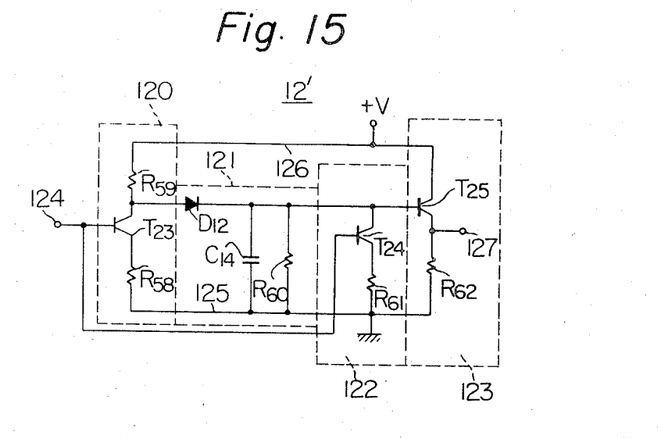
Figure 16:
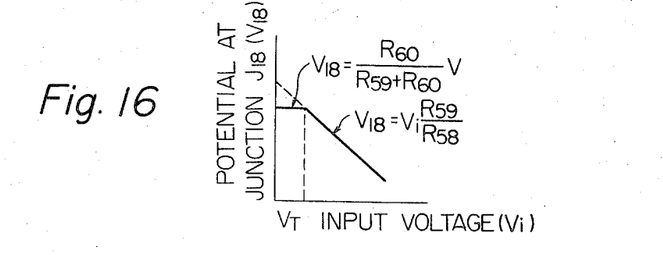
Figure 17:
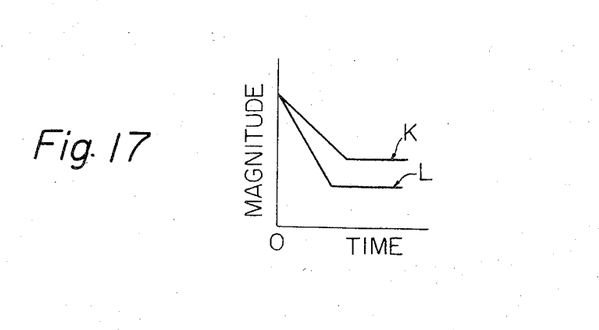

In FIG. 14, a detailed circuit arrangement of the first and second detectors 10a and 10b and a function generator 12'. The first collision detector 10a includes a switch element 110 adapted to close when an object closely approaches or contacts with the switch element 110. The switch element 110 has a movable contact connected to an earth bus line 111 which is grounded and a stationary contact which is connected through a resistor $R_{37}$ to a positive source bus line 112 which is connected to a positive source +V. The stationary contact is further connected through a capacitor $C_9$ and a resistor $R_{37}$ to the bus line 112. The second collision detector 10b includes a switch element 113 having the same function as the switch element 110. The switch element 113 has a movable contact connected to the bus line 111 and a stationary contact connected through a resistor $R_{39}$ to the bus line 112. The stationary contact is further contacted through a capacitor $C_{10}$ and a resistor $R_{40}$ to the bus line 112. The function generator 12' includes first and second monostable multivibrator 114a and 114b a signal generating circuit 115. The monostable multivibrator 114a includes transistors $T_{15}$ and $T_{16}$. The transistor $T_{15}$ has an emitter connected to the bus line 111 and a collector connected through a resistor $R_{41}$ to the bus line 112 and through a capacitor $C_{11}$ and a resistor $R_{42}$ to the bus line 112. The collector of the transistor $T_{15}$ is further connected to an anode of a diode $D_9$ a cathode of which is connected to a junction $J_{13}$ between the capacitor $C_9$ and the resistor $R_{38}$. A junction between the capacitor $C_{11}$ and the resistor $R_{42}$ is connected to a base of the transistor $T_{16}$. The transistor $T_{16}$ has an emitter connected to the bus line 111 and a collector connected through a resistor $R_{43}$ to the bus line 112. The collector of the transistor $T_{16}$ is further connected through a resistor $R_{44}$. The second monostable multivibrator 114b includes transistors $T_{17}$ and $T_{18}$. The transistor $T_{17}$ has an emitter connected to the bus line 111 and a collector connected through a resistor $R_{45}$ to the bus line 112 and through a capacitor $C_{12}$ and a resistor $R_{46}$ to the bus line 112. The collector of the transistor $T_{17}$ is connected to an anode of a diode $D_{10}$ having a cathode connected to a junction $J_{14}$ between the capacitor $C_{10}$ and the resistor $R_{40}$. A junction between the capacitor $C_{12}$ and the resistor $R_{46}$ is connected to a base of the transistor $T_{18}$. The transistor $T_{18}$ has an emitter connected to the bus line 111 and a collector connected through a resistor $R_{47}$ to the bus line 112. The collector of the transistor $T_{18}$ is further connected through a resistor $R_{48}$ to a base of the transistor $T_{17}$. The signal generating circuit includes transistors $T_{19}$, $T_{20}$, $T_{21}$ and $T_{22}$. The transistor $T_{19}$ has a base connected through a resistor $R_{49}$ to a junction $J_{15}$ between the resistors $R_{43}$ and $R_{44}$, and an emitter connected to the bus line 111. A collector of the transistor $T_{19}$ is connected through resistors $R_{50}$, $R_{51}$ and $R_{52}$ to the bus line 112. The transistor $T_{21}$ has an emitter connected to the bus line 111 and a collector connected to a junction $J_{16}$ between the resistors $R_{50}$ and $R_{51}$. A base of the transistor $T_{20}$ is connected through a resistor $R_{53}$ to a junction between the resistors $R_{47}$ and $R_{48}$. The transistor $T_{21}$ has an emitter connected to the bus line 111 and a base connected through a resistor $R_{54}$ to the junction between the resistors $R_{47}$ and $R_{48}$. A collector of the transistor $T_{21}$ is connected through a resistor $R_{55}$ to the bus line 111 and through a resistor $R_{56}$ to a base of the transistor $T_{22}$. The base of the transistor through a storing capacitor $C_{13}$ to the bus line 111 and direct $T_{22}$ is further connected $J_{17}$ to a cathode of a diode $D_{11}$ having an anode connected to a junction between the resistors $R_{51}$ and $R_{52}$. The transistor $T_{22}$ has an emitter connected through a resistor $R_{57}$ to the bus line 111 and a collector connected to the bus line 112. The emitter of the transistor $T_{22}$ is further connected to an output terminal 116.

When, in operation, the switch 110 is closed, a negative pulse appears at the junction $J_{13}$ which is then delivered through the diode $D_9$ to the monostable multivibrator 114a thereby to cause the monostable multivibrator turns to the quasi-stable state and remains in the quasi-stable state for a predetermined time interval. A positive pulse therefore appears at the junction $J_{15}$ which makes the transistor $T_{19}$ conductive whereby the capacitor $C_{13}$ id discharged through a current flowing through the resistors $R_{56}$ and $R_{55}$. The voltage at the base of the transistor $T_{22}$ therefore exponentially decreases to a voltage at the junction $J_{17}$. A voltage signal appears on the output terminal 116 which is analogous to the variation of the voltage at the junction $J_{17}$ as shown by the curve G in FIG. 12. When, on the contrary, the switch element 113 is closed, the monostable multivibrator 114b turns to its quasi-stable state, whereby a positive signal appears at the junction $J_{16}$ which is applied to the bases of the transistors $T_{20}$ and $T_{21}$. The transistors $T_{20}$ and $T_{21}$ become conductive. In this instance, it is to be noted that the voltage at the junction $J_{17}$ is lower than that in the case of the switch element 110 is closed, since the resistor $R_{50}$ is bypassed by the transistor $T_{20}$. Furthermore, the capacitor $C_{13}$ is rapidly discharged than the case of the closure of the switch element 110. Hence, a voltage signal appears on the output terminal 116, as shown by the curve H in FIG. 12.

It will be understood that the present invention is not to be limited to the exact constructions shown and described and that various changes and modifications may be made without departing from the spirit and scope of the invention as defined in the appended claims.

What is claimed is:

1. An electric collision detecting system for use with a safety device mounted on a motor vehicle, which comprises:
   a collision detector for producing a collision signal when an object contacts the motor vehicle;
   a deceleration detector for producing a real deceleration signal having a magnitude proportional to the magnitude of a deceleration subjected to the motor vehicle;
   a function generator connected to said collision detector and producing a reference deceleration signal upon receiving said collision signal;
   a comparator connected to said function generator and to said deceleration detector and producing a drive signal when said real deceleration signal exceeds said reference deceleration signal; and an
   actuator connected to said comparator and actuating the safety device upon receiving said drive signal, further comprising:
   a gate signal generator producing a gate signal when said reference deceleration signal is lower than a predetermined value;
   a gate for passing therethrough said drive signal from said comparator to said actuator when receiving said gate signal, and said gate includes an AND gate having one input terminal connected to an output terminal of said csmparator and the other terminal connected to an output terminal of said gate signal generator.

2. An electric collision detecting system for use with a safety device mounted on a motor vehicle, which comprises:
   a collision detector for producing a collision signal when an object contacts the motor vehicle;
   a deceleration detector for producing a real deceleration signal having a magnitude proportional to the magnitude of a deceleration subjected to the motor vehicle;
   a function generator connected to said collision detector and producing a reference deceleration signal upon receiving said collision signal;
   a comparator connected to said function generator and to said deceleration detector and producing a drive signal when said real deceleration signal exceeds said reference deceleration signal; and an actuator connected to said comparator and actuating the safety device upon receiving said drive signal, further comprising:

a wave-shaper connected between said deceleration detector and said comparator;

a test signal generator producing a pseudo deceleration signal on its first output terminal which is connected to an input of said wave-shaper, a test trigger signal on its second output terminal which is connected to an input terminal of said function generator and a disabling signal on its third output terminal;

a checking circuit having one input terminal connected to said second output terminal of said test signal generator and the other terminal connected to said output terminal of said comparator for producing an alarm signal when receiving said trigger signal but not receiving said drive signal from said comparator;

an alarm circuit for alarming when receiving said alarm signal from said checking circuit; and a gate interposed between said comparator and actuator for passing therethrough said drive signal when receiving said disabling signal from said third output/terminal of said test signal generator, and said checking circuit includes a flip-flop circuit having a set terminal connected to said second output terminal of said test signal generator, and a trigger circuit having an input terminal connected to said output terminal of the comparator and an output terminal connected to a reset terminal of said flip-flop circuit.

3. An electric collision detecting system for use with a safety device mounted on a motor vehicle, of the type which includes a deceleration detector producing a real deceleration signal proportional to a deceleration to which the motor vehicle is subjected, an actuator on the motor vehicle for actuating the safety device upon receiving a drive signal, said electric detecting system comprising:

a collision detector producing a collision signal;

a function generator having a trigger terminal connected to said collision detector to receive the collision signal to produce a reference deceleration signal upon receiving the collision signal;

a comparator connected to said function generator to receive the reference deceleration signal and to the deceleration detector to receive the real deceleration signal to produce the drive signal on its output terminal when the real deceleration signal exceeds the reference deceleration signal; and means connected between said comparator and said actuator for blocking the transmission of the drive signal to said actuator including another comparator to produce a gate signal when the reference deceleration signal lowers below a predetermined value and a gate means for blocking the drive signal in the absence of the gate signal.

4. An electric collision detecting system as claimed in claim 3, in which said collision detector includes a switch and a charge storing circuit connected in circuitry with said switch to produce the collision signal during a predetermined duration after the closure of said switch as far as said switch is kept closed, in which said function generator includes a charging and discharging circuit with a storing capacitor connected in ciruitry with said charge storing circuit to discharge a current of the storing capacitor thereof while the collision signal is present and an output terminal connected in circuitry with said charging and discharging circuit to produce the reference deceleration signal in the form of a voltage across the storing capacitor of said charging and discharging circuit.

5. An electric collision detecting system as claimed in claim 4, in which said gate means includes an AND gate having a first input terminal connected to the output terminal of said first mentioned comparator and a second input terminal connected to the comparator of said blocking means to receive the drive signal and the gate signal, respectively.

6. An electric collision detecting system as claimed in claim 4, in which said collision detector includes a second switch and a second charge storing circuit connected in circuitry with said second switch to produce a second collision signal during a predetermined duration after the closure of said second switch, and in which said function generator includes a trigger means for rendering said charging and discharging circuit to discharge a current of the storing capacitor thereof while said second collision signal is present after altering the resistance value of said charging and discharging circuit.

7. An electric collision detecting system as claimed in claim 4, which further comprises:

a test signal generator to produce a pseudo deceleration signal on its first output terminal which is connected to said first mentioned comparator, a test trigger signal on its second output terminal which is connected to said function generator to render said function generator to produce the reference deceleration signal and a disabling signal on its third output terminal;

a checking circuit having a first input terminal connected to the second output terminal of said test signal generator and a second input terminal connected to the output of said first mentioned comparator to receive therefrom the drive signal to produce an alarm signal when receiving the test signal only; and a second gate means connected to said third output terminal of said test signal generator for blocking the transmission of the drive signal to the actuator when the disabling signal is present.

8. An electric collision detecting system as claimed in claim 7, in which said checking circuit includes a flip-flop circuit having a set terminal connected to the second output terminal of said test signal generator, and a trigger circuit having an input terminal connected to said first mentioned comparator to receive the drive signal therefrom and an output terminal connected to a reset terminal of said flip-flop circuit.

9. An electric collision detecting system for use with a safety device mounted on a motor vehicle, which comprises:

a collision detector for producing a collision signal when an object contacts the motor vehicle;

a deceleration detector for producing a real deceleration signal having a magnitude proportional to the magnitude of a deceleration subjected to the motor vehicle;

a function generator connected to said collision detector and producing a reference deceleration signal upon receiving said collision signal;

a comparator connected to said function generator and to said deceleration detector and producing a drive signal when said real deceleration signal exceeds said reference deceleration signal; and an actuator connected to said comparator and actuating the safety device upon receiving said drive signal, further comprising:

a gate signal generator including a comparator connected to said function generator and producing a gate signal when said reference deceleration signal is lower than a predetermined value;

and gate means connected to said gate signal generator and between said first mentioned comparator and said actuator and passing therethrough said drive signal from said first mentioned comparator to said actuator when receiving said first gate signal.

* * * * *